(12) United States Patent
Burrows et al.

(10) Patent No.: US 9,786,966 B2
(45) Date of Patent: Oct. 10, 2017

(54) COLD PLATE ASSEMBLY FOR ELECTRIFIED VEHICLE BATTERY PACKS

(71) Applicant: FORD GLOBAL TECHNOLOGIES, LLC, Dearborn, MI (US)

(72) Inventors: Neil Robert Burrows, White Lake Township, MI (US); Kanchana Perumalla, Rochester Hills, MI (US); Rohit Gunna, Novi, MI (US); Keith Kearney, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 129 days.

(21) Appl. No.: 14/851,697

(22) Filed: Sep. 11, 2015

(65) Prior Publication Data

US 2017/0077565 A1 Mar. 16, 2017

(51) Int. Cl.
| | |
|---|---|
| *H01M 10/50* | (2006.01) |
| *H01M 10/625* | (2014.01) |
| *H01M 10/613* | (2014.01) |
| *H01M 10/6556* | (2014.01) |
| *H01M 10/60* | (2014.01) |

(52) U.S. Cl.
CPC ....... *H01M 10/625* (2015.04); *H01M 10/613* (2015.04); *H01M 10/6556* (2015.04); *H01M 10/60* (2015.04); *H01M 2220/20* (2013.01)

(58) Field of Classification Search
None
See application file for complete search history.

(56) References Cited

U.S. PATENT DOCUMENTS

| | | |
|---|---|---|
| 8,790,808 B2 | 7/2014 | Herrmann et al. |
| 8,920,956 B2 | 12/2014 | Gadawski |
| 2009/0023056 A1 | 1/2009 | Adams et al. |
| 2010/0279152 A1* | 11/2010 | Payne ..................... F28F 27/00 429/50 |
| 2013/0115506 A1* | 5/2013 | Wayne .............. H01M 10/5044 429/120 |
| 2013/0183555 A1 | 7/2013 | Boddakayala |
| 2013/0309543 A1 | 11/2013 | Kim et al. |
| 2014/0023894 A1 | 1/2014 | Jansen et al. |
| 2014/0338995 A1 | 11/2014 | McLaughlin et al. |
| 2015/0180096 A1* | 6/2015 | Schwab ................. F28F 21/08 429/120 |

FOREIGN PATENT DOCUMENTS

| | | |
|---|---|---|
| WO | 2013103254 A1 | 7/2013 |
| WO | 2014014407 A1 | 1/2014 |

* cited by examiner

*Primary Examiner* — Scott J Chmielecki
(74) *Attorney, Agent, or Firm* — Carlson, Gaskey & Olds

(57) ABSTRACT

An assembly according to an exemplary aspect of the present disclosure includes, among other things, a cold plate including a cooling circuit, a first end cap attached to the cold plate and a first manifold inside the first end cap and configured to fluidly connect a first fluid channel and a second fluid channel of the cooling circuit.

21 Claims, 4 Drawing Sheets

COLD PLATE ASSEMBLY FOR ELECTRIFIED VEHICLE BATTERY PACKS

TECHNICAL FIELD

This disclosure relates to a battery pack for an electrified vehicle. The battery pack includes a cold plate assembly having a cold plate and an end cap attached to the cold plate. The end cap includes an internal manifold for fluidly connecting adjacent fluid channels of a cooling circuit disposed inside the cold plate.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack for powering electric machines and other electrical loads typically includes multiple battery cells. The battery cells give off heat during charging and discharging operations. It is often desirable to dissipate this heat from the battery pack to improve capacity and life of the battery cells.

SUMMARY

An assembly according to an exemplary aspect of the present disclosure includes, among other things, a cold plate including a cooling circuit, a first end cap attached to the cold plate and a first manifold inside the first end cap and configured to fluidly connect a first fluid channel and a second fluid channel of the cooling circuit.

In a further non-limiting embodiment of the foregoing assembly, a second end cap is attached to the cold plate at an opposite end of the cold plate from the first end cap.

In a further non-limiting embodiment of either of the foregoing assemblies, a second manifold is formed inside the second end cap and configured to fluidly connect the second fluid channel to a third fluid channel of the cooling circuit.

In a further non-limiting embodiment of any of the foregoing assemblies, the first manifold is curved to transition a flow of a coolant from the first fluid channel to the second fluid channel.

In a further non-limiting embodiment of any of the foregoing assemblies, the cooling circuit establishes a serpentine passage inside the cold plate.

In a further non-limiting embodiment of any of the foregoing assemblies, an inlet port and an outlet port are integrated into the first end cap.

In a further non-limiting embodiment of any of the foregoing assemblies, the inlet port and the outlet port are each connected to a fitting.

In a further non-limiting embodiment of any of the foregoing assemblies, a second manifold connects between the inlet port and a third fluid channel of the cooling circuit.

In a further non-limiting embodiment of any of the foregoing assemblies, a third manifold connects between the outlet port and a fourth fluid channel of the cooling circuit.

In a further non-limiting embodiment of any of the foregoing assemblies, an inlet port is formed in the first end cap and an outlet port is formed in a second end cap.

A battery pack according to another exemplary aspect of the present disclosure includes, among other things, a cold plate assembly including a cold plate and an end cap attached to the cold plate. The end cap includes an internal manifold, an inlet port and an outlet port. A battery array is positioned relative to the cold plate assembly.

In a further non-limiting embodiment of the foregoing battery pack, the battery array includes a plurality of battery cells in contact with the cold plate.

In a further non-limiting embodiment of either of the foregoing battery packs, the cold plate includes a cooling circuit including a first fluid channel and a second fluid channel.

In a further non-limiting embodiment of any of the foregoing battery packs, a wall divides the first fluid channel from the second fluid channel.

In a further non-limiting embodiment of any of the foregoing battery packs, the first fluid channel and the second fluid channel are fluidly connected by the internal manifold.

In a further non-limiting embodiment of any of the foregoing battery packs, the first fluid channel and the second fluid channel define a serpentine passage.

In a further non-limiting embodiment of any of the foregoing battery packs, the internal manifold is curved.

In a further non-limiting embodiment of any of the foregoing battery packs, a second internal manifold connects to the inlet port.

In a further non-limiting embodiment of any of the foregoing battery packs, a third internal manifold connects to the outlet port.

A method according to another exemplary aspect of the present disclosure includes, among other things, communicating a coolant through a first fluid channel formed inside a cold plate of a battery pack and transitioning the coolant from the first fluid channel to a second fluid channel by communicating the coolant into a manifold formed inside an end cap attached to the cold plate.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. A cold plate assembly may be utilized to thermally manage heat generated by battery cells of the battery pack. In some embodiments, the cold plate assembly includes a cold plate and an end cap attached to the cold plate. Manifolds formed inside the end cap are configured to fluidly connect first and second fluid channels of a cooling circuit disposed inside the cold plate. In other embodiments, an inlet port and an outlet port are integrated into the end cap. These and other features are discussed in greater detail in the following paragraphs of this detailed description.

Figure 1:
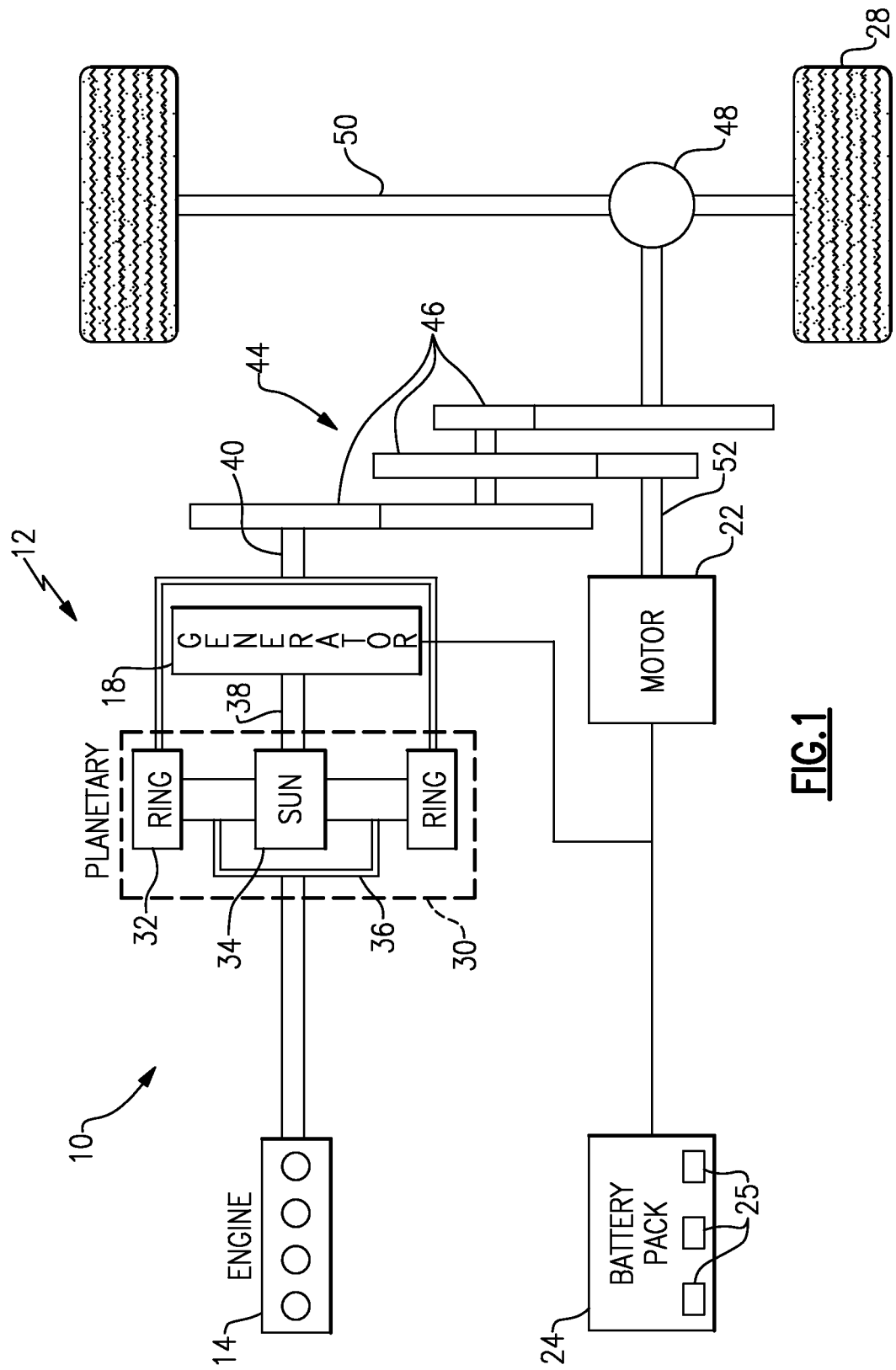
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
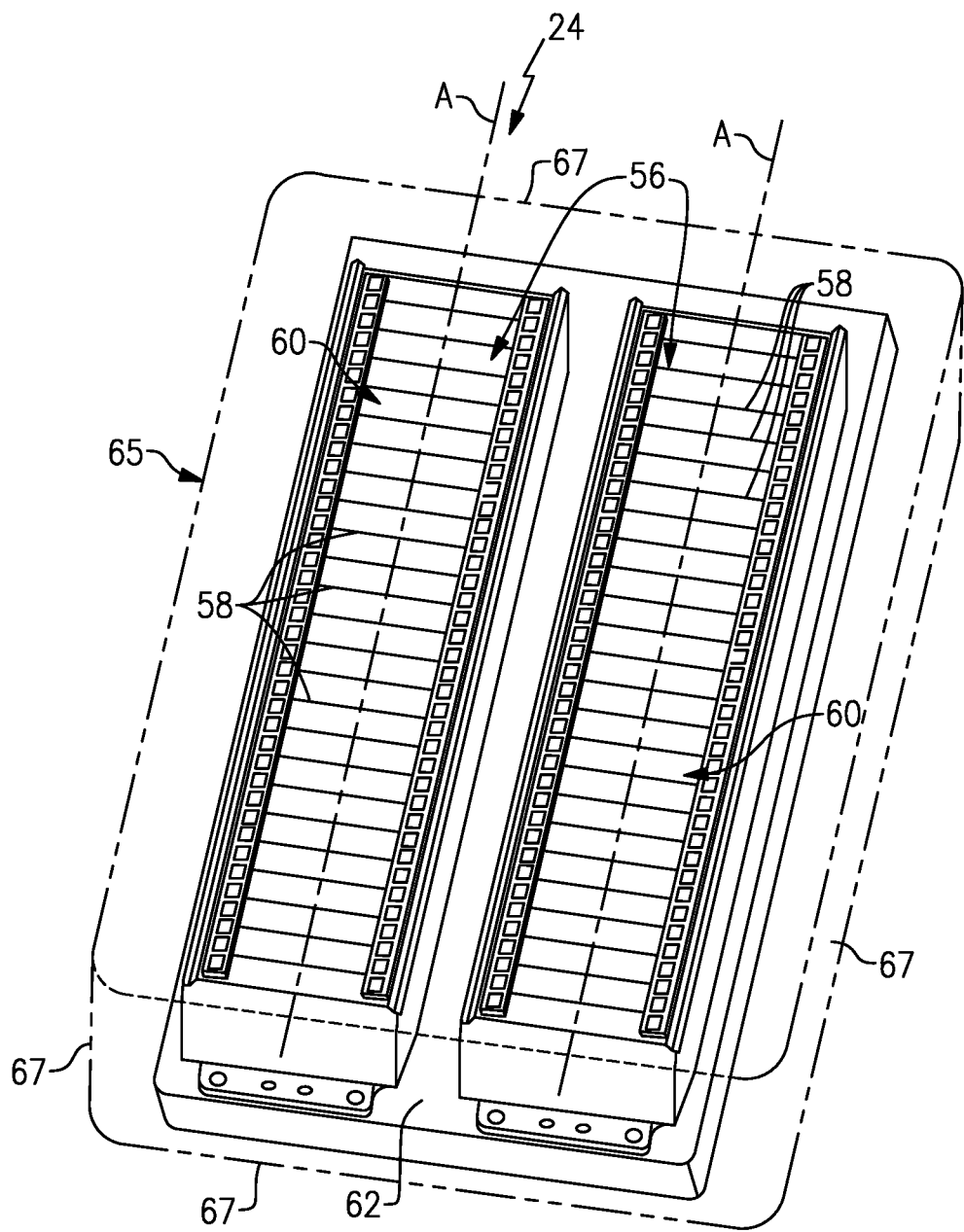
FIG. 2 illustrates a battery pack of an electrified vehicle.

FIG. 2 illustrates portions of a battery pack 24 that can be employed within an electrified vehicle. For example, the battery pack 24 could be part of the electrified vehicle 12 of FIG. 1. The battery pack 24 includes a plurality of battery cells 56 for supplying electrical power to various electrical loads of the electrified vehicle 12. Although a specific number of battery cells 56 are depicted in FIG. 2, the battery pack 24 could employ a fewer or greater number of battery cells within the scope of this disclosure. In other words, this disclosure is not limited to the specific configuration shown in FIG. 2.

The battery cells 56 may be stacked side-by-side along a longitudinal axis A to construct a grouping of battery cells 56, sometimes referred to as a "cell stack." In one non-limiting embodiment, the battery pack 24 includes two separate groupings of battery cells 56 (i.e., two cell stacks).

In another non-limiting embodiment, the battery cells 56 are prismatic, lithium-ion cells. However, battery cells having other geometries (cylindrical, pouch, etc.), other chemistries (nickel-metal hydride, lead-acid, etc.), or both, could alternatively be utilized within the scope of this disclosure.

In yet another non-limiting embodiment, spacers 58, which can alternatively be referred to as separators or dividers, may be positioned between adjacent battery cells 56 of each grouping of battery cells 56. The spacers 58 may include thermally resistant and electrically isolating plastics and/or foams. The battery cells 56 and the spacers 58, along with any other support structures (e.g., rails, walls, plates, etc.), may collectively be referred to as a battery array 60. Two battery arrays 60 are shown in FIG. 2; however, the battery pack 24 could include only a single battery array or greater than two battery arrays.

An enclosure 65 may generally surround each battery array 60 of the battery pack 24. The enclosure 65 includes a plurality of walls 67 arranged to substantially enclose the battery arrays 60.

Each battery array 60 is positioned relative the cold plate assembly 62. In one embodiment, a thermal insulation material may be positioned between the cold plate assembly 62 and the battery array 60. The cold plate assembly 62 is equipped with features for thermally managing the battery cells 56 of each battery array 60. For example, heat may be generated and released by the battery cells 56 during charging operations, discharging operations, extreme ambient conditions, or other conditions. It is often desirable to remove the heat from the battery pack 24 to improve capacity and life of the battery cells 56. The cold plate assembly 62, which may also be referred to as a heat exchanger plate, is configured to conduct the heat out of the battery cells 56. In other words, the cold plate assembly 62 acts as a heat sync to remove heat from the heat sources (i.e., the battery cells 56).

Figure 3:
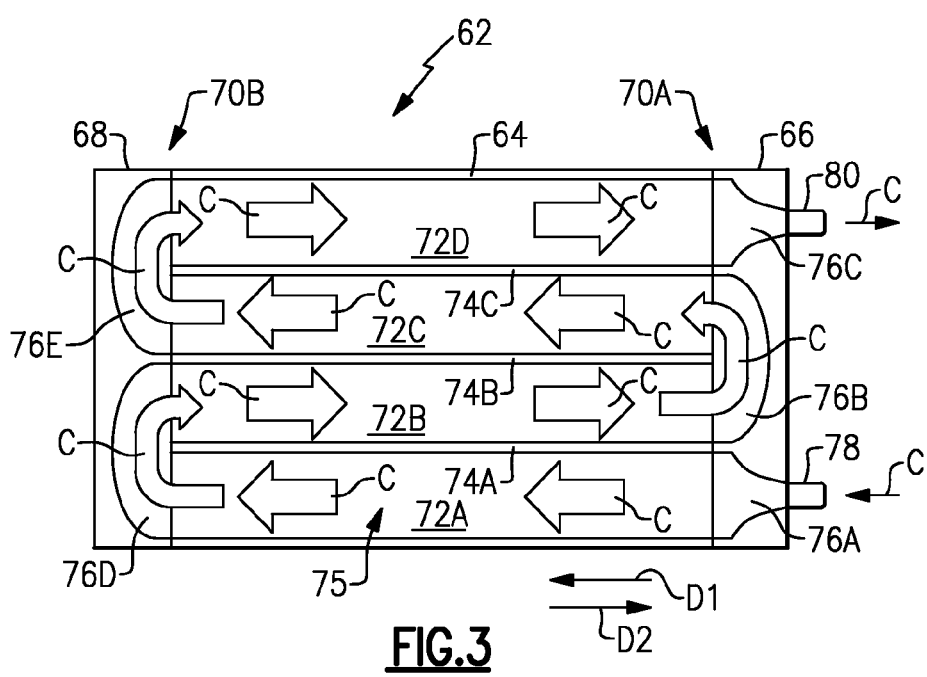
FIG. 3 illustrates a cold plate assembly of a battery pack.

An exemplary cold plate assembly 62 is illustrated in FIG. 3 (with continued reference to FIG. 2). The cold plate assembly 62 includes a cold plate 64, a first end cap 66 attached at a first end 70A of the cold plate 64 and a second end cap 68 attached at a second, opposite end 70B of the cold plate 64. In one non-limiting embodiment, the first and second end caps 66, 68 are separate structures from the cold plate 64 and may be welded, bonded, mechanically fastened or otherwise mounted to the cold plate 64.

The cold plate 64 and the first and second end caps 66, 68 may be extruded parts; however, other manufacturing techniques are also contemplated. In another non-limiting embodiment, the cold plate assembly 62 is made of aluminum. Other materials may also be suitable for constructing the cold plate assembly 62.

The cold plate 64 of the cold plate assembly 62 may include an internal cooling circuit 75 for circulating a coolant C to thermally condition the battery cells 56 of the battery pack 24. The coolant C may be a conventional type of coolant mixture such as water mixed with ethylene glycol. However, other coolants, including gases, are also contemplated within the scope of this disclosure.

In one non-limiting embodiment, the cooling circuit 75 includes a plurality of fluid channels 72A, 72B, 72C and 72D that extend inside the cold plate 64. The fluid channels 72 may connect to one another to establish a serpentine passage for communicating the coolant C through the cold plate assembly 62. Walls are disposed inside the cold plate 64 to separate adjacent fluid channels from one another. For example, a first wall 74A may separate the fluid channels 72A and 72B, a second wall 74B may separate the fluid channels 72B and 72C, and a third wall 74C may separate the fluid channels 72C and 72D.

This disclosure is not limited to the specific cooling circuit configuration shown in FIG. 3. In other words, the cooling circuit 75 could include a greater or fewer number of fluid channels and walls, and these fluid channels and walls could be arranged in different configurations to provide various coolant flow schemes. The actual design of the cooling circuit 75 may depend on the cooling requirements of the battery pack 24, among other design criteria.

In another non-limiting embodiment, a plurality of manifolds, or passages, may be formed inside the first and second end caps 66, 68. For example, the first end cap 66 may include manifolds 76A, 76B and 76C, and the second end cap 68 may include manifolds 76D and 76E. The manifolds 76A-76E may fluidly connect one or more of the fluid channels 72A-72D to other fluid channels 72A-72D of the cooling circuit 75. The fluid channels 72A-72D, the walls 74A-74C and the manifolds 76A-76E combine to efficiently distribute the coolant C through the cold plate assembly 62 in a manner that reduces pressure drop and improves temperature distribution across the cold plate 64.

Figure 4:
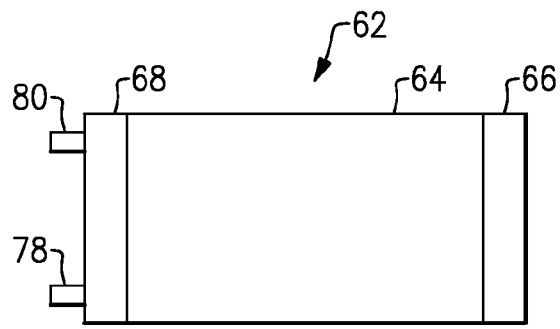
FIG. 4 illustrates an exemplary configuration of an inlet port and an outlet port of a cold plate assembly.
Figure 5:
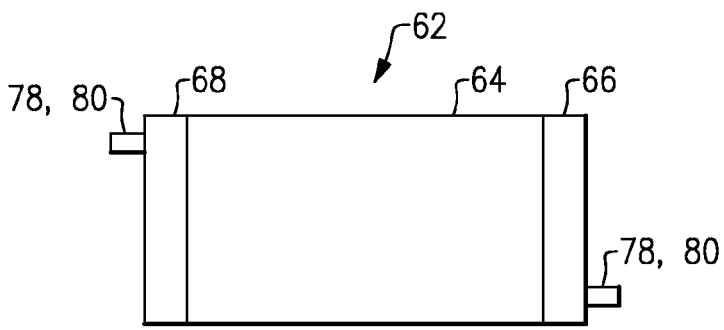
FIG. 5 illustrates another exemplary configuration of an inlet port and an outlet port of a cold plate assembly.

The first end cap 66 may include both an inlet port 78 and an outlet port 80. The inlet port 78 and the outlet port 80 may both be integrated into, or integrally formed with, the first end cap 66. In another non-limiting embodiment, the inlet port 78 and the outlet port 80 could be part of the second end cap 68 (see, for example, FIG. 4). In yet another non-limiting embodiment, one of the inlet port 78 and the outlet port 80 is integrated into the first end cap 66 and the other of the inlet port 78 and the outlet port 80 is integrated into the second end cap 68 (see, for example, FIG. 5).

Referring still primarily to FIG. 3, an exemplary method for thermally managing the battery cells 56 of the battery pack 24 using the cold plate assembly 62 described above will now be detailed. First, the coolant C may be directed into the inlet port 78 and enter into the first end cap 66. The manifold 76A connects between the inlet port 78 and the fluid channel 72A and therefore is configured to deliver the coolant C into the fluid channel 72A. The coolant C may next circulate in a direction D1 through the fluid channel 72A before entering the manifold 76D of the second end cap 68. The manifold 76D may be curved to reduce fluid resistance as the coolant C transitions from the fluid channel 72A to the fluid channel 72B.

Next, the coolant C matriculates in a direction D2, which is opposite the direction D1, through the fluid channel 72B prior to entering the manifold 76B of the first end cap 66. The manifold 76B may also be curved to reduce fluid resistance as the coolant C transitions from the fluid channel 72B to the fluid channel 72C. The coolant C may travel through the fluid channel 72C, in the direction D1, prior to entering the manifold 76E of the second end cap 68, which may also be curved to efficiently transition the coolant C from the fluid channel 72C to the fluid channel 72D. Finally, the coolant C may be communicated in the direction D2 through the fluid channel 72D and into the manifold 76C prior to exiting the cold plate assembly 62 through the outlet port 80. Although not shown, the coolant C exiting the outlet port 80 may be delivered to a radiator or some other heat exchanging device, be cooled, and then returned to the inlet port 78 in a closed loop.

Figure 6:
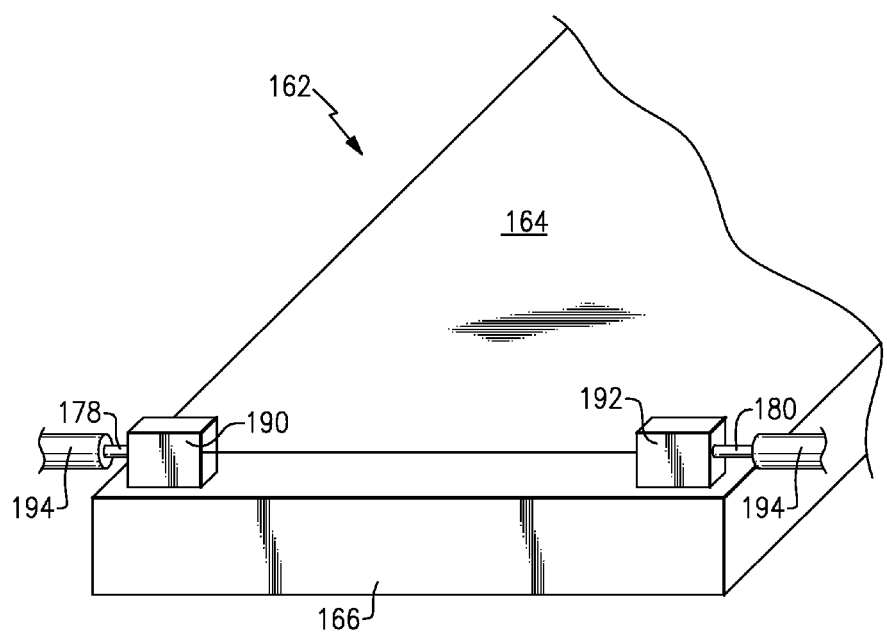
FIG. 6 illustrates another exemplary cold plate assembly.

FIG. 6 illustrates another exemplary cold plate assembly 162. The cold plate assembly 162 is similar to the cold plate assembly 62 of FIG. 3 but includes additional features. In this embodiment, the cold plate assembly 162 includes a cold plate 164 and at least one end cap 166 attached to the cold plate 164. The end cap 166 can include an inlet fitting 190 and an outlet fitting 192 for directing coolant into and out of the cold plate 164. The inlet fitting 190 includes an inlet port 178, and the outlet fitting 192 includes an outlet port 180. The inlet and outlet fittings 190, 192 may be formed integrally with the end cap 166. Hoses 194 may be attached to both the inlet port 178 and the outlet port 180 for communicating the coolant C.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An assembly, comprising:
    a cold plate including a cooling circuit;
    a first end cap attached to said cold plate; and
    a first manifold formed inside said first end cap and configured to fluidly connect a first fluid channel and a second fluid channel of said cooling circuit.

2. The assembly as recited in claim 1, comprising a second end cap attached to said cold plate at an opposite end of said cold plate from said first end cap.

3. The assembly as recited in claim 2, comprising a second manifold formed inside said second end cap and configured to fluidly connect said second fluid channel to a third fluid channel of said cooling circuit.

4. The assembly as recited in claim 1, wherein said first manifold is curved to transition a flow of a coolant from said first fluid channel to said second fluid channel.

5. The assembly as recited in claim 1, wherein said cooling circuit establishes a serpentine passage inside said cold plate.

6. The assembly as recited in claim 1, comprising an inlet port and an outlet port integrated into said first end cap.

7. The assembly as recited in claim 6, wherein said inlet port and said outlet port are each connected to a fitting.

8. The assembly as recited in claim 6, comprising a second manifold that connects between said inlet port and a third fluid channel of said cooling circuit.

9. The assembly as recited in claim 8, comprising a third manifold that connects between said outlet port and a fourth fluid channel of said cooling circuit.

10. The assembly as recited in claim 1, comprising an inlet port formed in said first end cap and an outlet port formed in a second end cap.

11. A battery pack, comprising:
    a cold plate assembly including a cold plate and an end cap attached to said cold plate, said end cap housing including an internal manifold and including an inlet port and an outlet port; and
    a battery array positioned relative to said cold plate assembly;
    wherein said cold plate includes a cooling circuit including a first fluid channel and a second fluid channel.

12. The battery pack as recited in claim 11, wherein said battery array includes a plurality of battery cells in contact with said cold plate.

13. The battery pack as recited in claim 11, comprising a wall that divides said first fluid channel from said second fluid channel.

14. The battery pack as recited in claim 11, wherein said first fluid channel and said second fluid channel are fluidly connected by said internal manifold.

15. The battery pack as recited in claim 11, wherein said first fluid channel and said second fluid channel define a serpentine passage.

16. The battery pack as recited in claim 11, wherein said internal manifold is curved.

17. The battery pack as recited in claim 11, comprising a second internal manifold that connects to said inlet port.

18. The battery pack as recited in claim 17, comprising a third internal manifold that connects to said outlet port.

19. A method, comprising:
    communicating a coolant through a first fluid channel formed inside a cold plate of a battery pack; and
    transitioning the coolant from the first fluid channel to a second fluid channel by communicating the coolant into a manifold formed inside an end cap attached to the cold plate.

20. The assembly as recited in claim 1, wherein said first manifold is part of a separate structure from said cold plate.

21. The battery pack as recited in claim 11, wherein said battery array is positioned on top of said cold plate assembly.

* * * * *

UNITED STATES PATENT AND TRADEMARK OFFICE
CERTIFICATE OF CORRECTION

PATENT NO. : 9,786,966 B2  
APPLICATION NO. : 14/851697  
DATED : October 10, 2017  
INVENTOR(S) : Neil Robert Burrows et al.

Page 1 of 1

It is certified that error appears in the above-identified patent and that said Letters Patent is hereby corrected as shown below:

In the Claims

In Claim 11, Column 8, Line 9; after "said end cap" delete "housing"

Signed and Sealed this  
Twenty-second Day of May, 2018

Andrei Iancu  
*Director of the United States Patent and Trademark Office*